Patented Sept. 7, 1948

2,448,871

UNITED STATES PATENT OFFICE 2,448,871

AZO COMPOUNDS CONTAINING A TETRAHYDROQUINOLINE NUCLEUS

Joseph B. Dickey, Rochester, N. Y., and James G. McNally, Kingsport, Tenn., assignors to Eastman Kodak Company, Rochester, N. Y., a corporation of New Jersey No Drawing. Application December 29, 1945, Serial No. 638,498

1 Claim. (Cl. 260—155)

This invention relates to new azo compounds containing a 2,2-di(low carbon alkyl group)-3,4-dihydroxytetrahydroquinoline nucleus and their application for the coloration of textile materials.

We are aware that azo compounds containing a tetrahydroquinoline nucleus are known. Thus azo compounds containing a 3-hydroxytetrahydroquinoline nucleus are disclosed in U. S. Patent 2,067,726, issued January 12, 1937. Similarly azo compounds containing a 3-hydroxytetrahydroquinoline nucleus are disclosed in U. S. Patent 2,161,627, issued June 6, 1939. Likewise azo compounds containing a 2-(low carbon alkyl group)-tetrahydroquinoline nucleus are disclosed in our U. S. Patent 2,342,678, issued February 29, 1944.

We have now discovered that azo compounds containing a 2,2-di(low carbon alkyl group)-3,4-dihydroxytetrahydroquinoline nucleus constitute a valuable class of dye compounds suitable for the coloration of nylon and organic derivatives of cellulose, especially cellulose acetate rayon, textile materials. The azo compounds of our invention have the general formula:

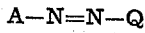

A—N=N—Q wherein A stands for the residue of an aryl nucleus of the benzene series and Q stands for a 2,2-di(low carbon alkyl group) - 3,4 - dihydroxytetrahydroquinoline joined to the azo bond shown through the carbon atom in its 6-position.

It is an object of our invention to provide new azo tetrahydroquinoline compounds. Another object is to provide new azo compounds useful for the coloration of nylon and organic derivatives of cellulose. Another object is to provide colored nylon and organic derivatives of cellulose textile materials which possess good fastness to light and washing, and which have good dischargeability. A further object is to provide a satisfactory process for the preparation of the new azo compounds of our invention.

The azo compounds of our invention can be prepared by coupling a diazotized arylamine of the benzene series with a 2,2-di(low carbon alkyl group) - 3,4 - dihydroxytetrahydroquinoline compound containing no substituent which would prevent coupling.

Arylamines that can be used in the preparation of the azo compounds of our invention include, for example, aniline, p-aminoacetophenone, p-nitroaniline, o-chloro-p-nitroaniline, 2,4-dinitroaniline, 2-hydroxy-4-nitroaniline, 1-amino-6-N-ethylsulfamyl-4-nitrobenzene, 1-amino-6-N-ethylsulfamyl-2,4-dinitrobenzene, o-aminophenylmethylsulfone, 2-cyano-4-nitroaniline, 4-cyano-2-nitroaniline, 2-amino - 5 - nitrophenylmethyl ketone, 2-amino-5-nitrophenylmethylsulfone, 6-chloro-2,4-dinitroaniline, 6-hydroxy-2,4-dinitroaniline, 2,4,6-trinitroaniline, 2-amino-3,5-dinitrophenylmethyl sulfone, 4-methyl-2-nitroaniline, 2,6-dichloro-4-nitroaniline, 4-fluoro-2-nitroaniline, 2-trifluoromethyl-4-nitroaniline, 2-methoxy-4-nitroaniline, 2-n-butoxy-4-nitroaniline, 2-ethyl-4-nitroaniline, 5-nitro-2-aminobenzene sulfonic acid, 5-nitro-2-aminobenzene carboxylic acid, p-aminoazobenzene and p-sulfanilic acid.

We would here note that the nuclear sulfonated compounds of our invention possess little or no affinity for organic derivatives of cellulose textile materials. However, they are useful for the coloration of nylon textile materials. Preferably when the dye compounds are to be used to color organic derivatives of cellulose textile materials they should contain no nuclear sulfonic or carboxylic acid groups.

2,2-di(low carbon alkyl group)-3,4-dihydroxytetrahydroquinoline compounds that can be used in the preparation of the azo compounds of the invention include, for example: 1-β,γ-dihydroxypropyl-3,4-dihydroxy - 2,2,4,7 - tetramethyltetrahydroquinoline, 3,4 - dihydroxy-2,2,4-trimethyltetrahydroquinoline, 1-β-hydroxyethyl-2,2-diethyl - 3,4 - dihydroxy-7-methoxy-tetrahydroquinoline, 1-β-hydroxyethyl-3,4-dihydroxy - 2,2,4 - trimethyltetrahydroquinoline, 1 - β-hydroxypropyl-3,4-dihydroxy - 2,2,4 - trimethyltetrahydroquinoline, 1-γ-hydroxypropyl-2,2,4-trimethyl-8-methoxytetrahydroquinoline, 1 - β,γ-dihydroxypropyl-3,4-dihydroxy-2,2 - dimethyltetrahydroquinoline, 1-4,5-dihydroxy-n-amyl - 3,4 - dihydroxy-2,2-dimethyltetrahydroquinoline and 7-acetylamino-1-β,γ - dihydroxypropyl - 3,4 - dihydroxy-2,2,4-trimethyltetrahydroquinoline.

The following examples illustrate the azo compounds of our invention and their manner of preparation.

EXAMPLE 1

29.0 grams of 1-amino-6-N-ethylsulfamyl-2,4-dinitrobenzene are diazotized in known fashion in a mixture of nitrosyl sulfuric acid and acetic acid. The diazo solution resulting is poured into ice water and the precipitated diazo compound is recovered by filtration and added to an acetic acid solution of 29.5 grams of 1-β,γ-dihydroxypropyl-3,4 - dihydroxy - 2,2,4,7 - tetramethyltetrahydroquinoline. The coupling reaction which takes place is completed by adding sodium carbonate until the reaction mixture is neutral to Congo red paper. Upon completion of the coupling reaction the dye compound formed is precipitated by adding water, recovered by filtration, washed with water and dried. The dye compound obtained has the formula:

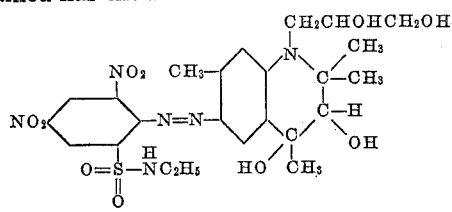

and colors nylon and cellulose acetate rayon blue.

EXAMPLE 2

21.8 grams of 1-amino-2-chloro-4,6-dinitrobenzene are diazotized in known fashion and the diazonium compound obtained is coupled in an acetic acid medium with 29.5 grams of 1-β,γ-dihydroxypropyl - 3,4 - dihydroxy - 2,2,4,7 - tetramethyltetrahydroquinoline. The coupling reaction which takes place is completed by adding sodium carbonate until the reaction mixture is neutral to Congo red paper. Upon completion of the coupling reaction, the dye compound formed is precipitated by adding water, recovered by filtration, washed with water and dried. The dye compound obtained colors nylon and cellulose acetate rayon reddish-blue shades.

EXAMPLE 3

21.6 grams of 2-amino-5-nitrophenyl methyl sulfone are diazotized in known fashion and the diazonium compound obtained is coupled with 29.5 grams of 1-β,γ-dihydroxypropyl-3,4-dihydroxy - 2,2,4,7 - tetramethyltetrahydroquinoline. Coupling and recovery of the dye compound formed can be carried out in accordance with the procedure described in Example 2. The dye compound obtained colors nylon and cellulose acetate rayon violet shades.

EXAMPLE 4

13.8 grams of p-nitroaniline are diazotized in the usual manner and the diazonium compound obtained is added to a cold hydrochloric acid solution of 14.7 grams of 3,4-dihydroxy-2,2,4-trimethyltetrahydroquinoline. The coupling reaction which takes place is completed by adding sodium carbonate until the reaction mixture is just neutral to Congo red paper. The dye compound formed is recovered by filtration, washed with water and dried. It colors cellulose acetate rayon and nylon red shades.

EXAMPLE 5

17.3 grams of o-chloro-p-nitroaniline are diazotized and the diazonium compound obtained is added to a cold hydrochloric acid solution of 19.2 grams of 1-β-hydroxyethyl-3,4-dihydroxy-2,2,4-trimethyltetrahydroquinoline. Coupling and recovery of the dye formed can be carried out in accordance with the procedure described in Example 4. The dye compound obtained colors cellulose acetate rayon and nylon rubine shades.

EXAMPLE 6

24.5 grams of 1-amino-6-N-ethylsulfamyl-4-nitrobenzene are diazotized in known fashion in a mixture of nitrosyl sulfuric acid and acetic acid. The diazo solution resulting is poured into ice water and the cyclic diazo compound that separates out is recovered by filtration and added to an acetic acid solution of 29.5 grams of 1-β,γ-dihydroxypropyl - 3,4 - dihydroxy - 2,2,4,7 - tetramethyltetrahydroquinoline. The coupling reaction which takes place is completed by adding sodium carbonate until the reaction mixture is neutral to Congo red paper. Upon completion of the coupling reaction, the dye compound formed is precipitated by adding water, recovered by filtration, washed with water and dried. The dye compound obtained colors nylon and cellulose acetate rayon violet shades.

EXAMPLE 7

27.3 grams of 2,4-dinitroaniline are diazotized and the diazonium compound obtained is poured onto ice and added to an iced sulfuric acid solution of 26.3 grams of 7-acetylamino-1-β-hydroxypropyl-3,4-dihydroxy-2,2,4-trimethyltetrahydroquinoline. The coupling reaction which takes place is completed by adding sodium carbonate until the reaction mixture is just neutral to Congo red paper. The dye compound obtained is recovered by filtration, washed with water and dried. It colors cellulose acetate rayon and nylon bluish-violet shades.

EXAMPLE 8

21.8 grams of 2-amino-5-nitrobenzene sulfonic acid are diazotized in known fashion and the diazonium compound obtained is coupled in a cold acetic acid medium with 29.5 grams of 1-β,γ-dihydroxypropyl - 3,4 - dihydroxy - 2,2,4,7-tetramethyltetrahydroquinoline. Coupling is completed by adding sodium acetate until the reaction mixture is neutral to Congo red paper. The dye compound formed is recovered by filtration and dried. Sodium chloride may be added if desired to aid in precipitating the dye. It colors nylon and wool rubine shades.

EXAMPLE 9

33.6 grams of

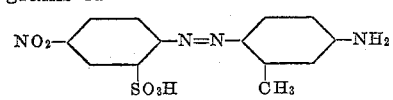

are diazotized in known fashion and the diazonium compound obtained is coupled in a cold acetic acid medium with 23.5 grams of 1-β,γ-dihydroxypropyl - 2,2 - diethyl - 3,4 - dihydroxytetrahydroquinoline. Coupling is completed by adding sodium acetate until the reaction mixture is neutral to Congo red paper. The dye compound formed is recovered by filtration, washed with water and dried. It colors nylon and wool rubine shades.

EXAMPLE 10

The dye compound obtained by coupling 27.3 grams of o-chloro-p-nitroaniline with 17.5 grams of 1-ethyl-3,4-dihydroxy-2,2,4-trimethyltetrahydroquinoline is dissolved in carbon tetrachloride and 0.1 gram mole of chlorosulfonic acid is slowly added while maintaining the reaction mixture in a cooled condition. The reaction mixture is warmed to 50° C. and then an aqueous solution of sodium bicarbonate is added until the mixture is just alkaline to litmus. The carbon tetrachloride is removed and the monosulfated dye is precipitated by adding sodium chloride. The dye compound obtained colors cellulose acetate rayon, wool, silk and nylon rubine shades. The phosphato and phosphito derivatives may be prepared in a similar manner using the proper reagent.

The following tabulation further illustrates the compounds of our invention together with the color they produce on cellulose acetate rayon and nylon. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in the foregoing examples.

compounds into the 3,4-dihydroxytetrahydroquinoline compounds. Thus 3,4-dihydroxy-2,2,4-trimethyltetrahydroquinoline can be prepared by oxidation of 2,2,4-trimethyl-1,2-dihydroquinoline and 1-β,γ-dihydroxypropyl-3,4-dihydroxy-2,2,4,7-tetramethyl-tetrahydroquinoline can be prepared by oxidation of 1-β,γ-dihydroxypropyl-2,2,4,7-tetramethyl-1,2-dihydroquinoline. The preparation of the above two compounds is described hereinafter.

*Preparation of 3,4-dihydroxy-2,2,4-trimethyltetrahydroquinoline*

17.3 grams of 2,2,4-trimethyl-1,2-dihydroquinoline are placed in 1 liter of water and 0.1 gram of tungstic oxide. An aqueous solution of 0.16 gram mole of hydrogen peroxide is then added

| Amine | Coupling Component | Color |
|---|---|---|
| p-aminoacetophenone | (1) 7-chloro-3,4-dihydroxy-2,2,4-trimethyltetrahydroquinoline | orange. |
| Do | (2) 1-β-hydroxyethyl-2,2-diethyl-3,4-dihydroxy-7-methoxy-tetrahydroquinoline. | Do. |
| Do | (3) 1-β-hydroxyethyl-3,4-dihydroxy-2,2,4-trimethyltetrahydroquinoline. | Do. |
| Do | (4) 1-β-hydroxyethyl-3,4-dihydroxy-2,2,4,5-tetramethyltetrahydroquinoline. | Do. |
| Do | (5) 1-β-sulfoethyl-2,2,4-triethyl-3,4,8-trihydroxytetrahydroquinoline. | Do. |
| Do | (6) 1-β-hydroxypropyl-3,4-dihydroxy-2,2,4,7-tetramethyltetrahydroquinoline. | Do. |
| Do | (7) 1-γ-hydroxypropyl-3,4-dihydroxy-8-methoxy-2,2,4-trimethyltetrahydroquinoline. | Do. |
| Do | (8) 1-β,γ-dihydroxyproxyl-3,4-dihydroxy-2,2,4-trimethyltetrahydroquinoline. | Do. |
| Do | (9) 1-β,γ-dihydroxypropyl-3,4-dihydroxy-2,2,4,5-tetramethyltetrahydroquinoline. | Do. |
| Do | (10) 1-β,γ-dihydroxypropyl-3,4-dihydroxy-2,2,4,7-tetramethyltetrahydroquinoline. | Do. |
| Do | (11) 1-β,γ-dihydroxypropyl-3,4-dihydroxy-8-methoxy-2,2,4-trimethyltetrahydroquinoline. | Do. |
| Do | (12) 1-β,γ-dihydroxypropyl-5-acetylamino-3,4-dihydroxy-2,2,4-trimethyltetrahydroquinoline. | Do. |
| Do | (13) 1-β,γ-dihydrodroxypropyl-7-acetylamino-3,4-dihydroxy-2,2,4-trimethyltetrahydroquinoline. | Do. |
| Do | (14) 1-β-hydroxyethyl-7-acetylamino-3,4-dihydroxy-2,2,4-trimethyltetrahydroquinoline. | Do. |
| Do | (15) 1-β-hydroxyethyl-5-acetylamino-3,4-dihydroxy-2,2,4-trimethyltetrahydroquinoline. | Do. |
| Do | (16) 1-β-hydroxypropyl-5-acetylamino-3,4-dihydroxy-2,2,4-trimethyltetrahydroquinoline. | Do. |
| Do | (17) 1-β-hydroxypropyl-7-acetylamino-3,4-dihydroxy-2,2,4-trimethyltetrahydroquinoline. | Do. |
| o-aminophenylmethylsulfone | Coupling Components 1-17 above | Do. |
| p-nitroaniline | do | orange to rubine. |
| o-chloro-p-nitroaniline | do | Do. |
| o-hydroxy-p-nitroaniline | do | pinkish-red to rubine. |
| o-cyano-p-nitroaniline | do | red to violet. |
| 2-amino-5-nitrophenyl-methylketone | do | Do. |
| 2-amino-5-nitrophenylmethyl sulfone | do | Do. |
| 1-amino-6-N-ethylsulfamyl-4-nitro-benzene | do | Do. |
| 2,4-dinitroaniline | do | rubine to blue. |
| 6-chloro-2,4-dinitroaniline | do | rubine to greenish-blue. |
| 6-hydroxy-2,4-dinitroaniline | do | Do. |
| 1-amino-6-N-ethylsulfamyl-2,4-dinitrobenzene | do | Do. |
| 2,4,6-trinitroaniline | do | Do. |
| 2-amino-3,5-dinitrophenylmethyl sulfone | do | Do. |
| p-aminoazobenzene | do | orange to rubine. |
| 4-methyl-2-nitroaniline | do | Do. |
| 5-nitro-2-aminobenzene carboxylic acid | do | red to violet. |
| 2,6-dichloro-4-nitroaniline | do | brownish-red to brownish-violet. |
| 2-methoxy-4-nitroaniline | do | red to rubine. |
| 2-methyl-4-nitroaniline | do | Do. |

It will be understood that the examples given of the compounds of our invention are intended to be illustrative and not limitative. Any of the diazonium compounds indicated herein can be coupled with any of the coupling components to yield dye compounds of the invention. Thus, diazotized 5-nitro-2-aminobenzene sulfonic acid can be coupled with any of the coupling components disclosed in the tabulation above to obtain dye compounds which color nylon and wool red to violet shades.

The tetrahydroquinoline coupling compounds employed in the preparation of the azo compounds of our invention can be prepared by oxidation of the corresponding 1,2-dihydroquinoline and the reaction mixture is warmed to 50° C. and maintained at this temperature until the oxidation reaction is complete. The 3,4-dihydroxy-2,2,4-trimethyltetrahydroquinoline formed in the reaction is recovered from the reaction mixture by extraction with benzene or carbon tetrachloride, from which it is recovered by removal of the benzene or carbon tetrachloride by distillation or evaporation.

*Preparation of 1-β,γ-dihydroxypropyl-3,4-dihydroxy-2,2,4,7-tetramethyltetrahydroquinoline*

This compound can be prepared by substituting 26.3 grams of 1-β,γ-dihydroxypropyl-2,2,4,7-tetramethyl-1,2-dihydroquinoline for 2,2,4-trimethyl-1,2-dihydroquinoline in the preceding example.

Alternately, it can be prepared by using 2,2,4,7-tetramethyl-1,2-dihydroquinoline in the foregoing reaction and introducing the β,γ-dihydroxypropyl group by reaction with glycerolchlorohydrin (ClCH₂CHOHCH₂OH).

It will be understood that the aliphatic group that can be attached to the nitrogen atom of the tetrahydroquinoline nucleus can be introduced by methods well known to those skilled in the art to which this invention is directed. Thus alkyl groups can be introduced by appropriate treatment with alkyl halides, and hydroxyalkyl groups can be introduced by treatment with alkylene oxides or by treatment with a halohydrin such as ethylene chlorohydrin, propylene chlorohydrin, trimethylene chlorohydrin, 1-chloro-2,3,4-trihydroxybutane, glycerol chlorohydrin and β-methyl-β,γ-dihydroxychlorohydrin. The group can be introduced into the starting 1,2-dihydroquinoline compound or the 3,4-dihydroxytetrahydroquinoline obtained therefrom.

The azo compounds of our invention can be employed for the coloration of the materials named herein by the well known methods, employed by those skilled in the art, for the coloration of these materials.

We claim:
The azo compound having the formula:

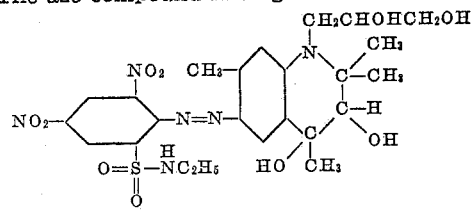

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,067,726 | Ohlendorf et al. | Jan. 12, 1937 |
| 2,161,627 | Knight | June 6, 1939 |
| 2,227,963 | Dickey et al. | Jan. 7, 1941 |
| 2,249,774 | McNally et al. | July 22, 1941 |
| 2,261,176 | McNally et al. | Nov. 4, 1941 |
| 2,323,315 | Dickey et al. | July 6, 1943 |
| 2,342,678 | McNally et al. | Feb. 29, 1944 |
| 2,364,347 | Dickey et al. | Dec. 5, 1944 |